United States Patent
Gokhale et al.

(10) Patent No.: US 9,965,187 B2
(45) Date of Patent: May 8, 2018

(54) NEAR-MEMORY DATA REORGANIZATION ENGINE

(71) Applicant: Lawrence Livermore National Security, LLC, Livermore, CA (US)

(72) Inventors: Maya Gokhale, Livermore, CA (US); G. Scott Lloyd, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 150 days.

(21) Appl. No.: 15/047,173

(22) Filed: Feb. 18, 2016

(65) Prior Publication Data

US 2017/0242590 A1    Aug. 24, 2017

(51) Int. Cl.
*G06F 12/00* (2006.01)
*G06F 3/06* (2006.01)

(52) U.S. Cl.
CPC .......... *G06F 3/0605* (2013.01); *G06F 3/0626* (2013.01); *G06F 3/0647* (2013.01); *G06F 3/0658* (2013.01); *G06F 3/0673* (2013.01)

(58) Field of Classification Search
None
See application file for complete search history.

(56) References Cited

U.S. PATENT DOCUMENTS

| 2014/0237010 | A1* | 8/2014 | Ge | G06F 17/16 708/204 |
| 2016/0103707 | A1* | 4/2016 | Bhattacharya | G06F 9/44505 718/102 |
| 2017/0163698 | A1* | 6/2017 | Shrivastava | H04L 65/4069 |
| 2017/0177269 | A1* | 6/2017 | Beard | G06F 3/0647 |

\* cited by examiner

*Primary Examiner* — John A Lane
(74) *Attorney, Agent, or Firm* — Perkins Coie LLP

(57) ABSTRACT

A memory subsystem package is provided that has processing logic for data reorganization within the memory subsystem package. The processing logic is adapted to reorganize data stored within the memory subsystem package. In some embodiments, the memory subsystem package includes memory units, a memory interconnect, and a data reorganization engine ("DRE"). The data reorganization engine includes a stream interconnect and DRE units including a control processor and a load-store unit. The control processor is adapted to execute instructions to control a data reorganization. The load-store unit is adapted to process data move commands received from the control processor via the stream interconnect for loading data from a load memory address of a memory unit and storing data to a store memory address of a memory unit.

27 Claims, 15 Drawing Sheets

NEAR-MEMORY DATA REORGANIZATION ENGINE

STATEMENT REGARDING FEDERALLY SPONSORED RESEARCH

The United States government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

The effective computational speed of a computer depends both on the speed of the central processing unit ("CPU") of the computer and the speed at which data can be retrieved from external memory to the CPU. The phrase "memory wall" refers to the growing disparity between the computational speed and the memory retrieval speed of computers. This disparity occurs in part because of the limited communication bandwidth beyond chip boundaries. CPU speed has traditionally increased at a much greater rate than memory retrieval speed. Because of this trend, it is expected that memory latency may become an overwhelming bottleneck in computer performance.

The disparity is further increased because many computers now use multiple core architectures with heterogeneous computational units (e.g., graphics processing units). Because of spatial parallelism, the use of multiple cores enables continued improvement in peak floating-point operations per second ("flops"), which is a measure of computational speed. To mitigate the increasing disparity between the computational speed and memory retrieval speed, multiple core architectures incorporate deep cache hierarchies to increase the likelihood that memory accesses by an application will be satisfied from a cache. Many memory-intensive applications, however, might not benefit from cache hierarchies because they have little spatial or temporal access locality. In addition, because caching techniques retrieve complete cache lines, memory bandwidth and power are wasted by retrieving data that is not used. For example, if a cache line is 64 bytes and an application uses only 8 bytes of each cache line, the caching technique results in eight times the amount of data that is used by the application being retrieved. Also, for these applications, the computational units often sit idle waiting for the next cache line of data to be retrieved. For example, the popular PageRank algorithm represents a graph of nodes representing web pages and edges representing links between web pages as a sparse matrix. The algorithm accesses random locations within the matrix and within a vector with an entry for each web page. Although direct memory access ("DMA") and scatter/gather hardware integrated with the CPU can help gather the needed data, all the data still needs to be retrieved from the memory. The memory wall thus has the potential to severely limit the ability to analyze expanding data volumes.

To help overcome the memory wall, designs have been proposed to integrate processing logic with memory. Some of these designs were based on integration of the processing logic in the fabrication process of dynamic random access memory ("DRAM") cells. Because of the cost of integrating the processing logic with DRAM cells, such designs have proved to be commercially unfeasible. More recently, other designs have been proposed to include the processing logic of a central processing unit ("CPU") in a separate logic layer of a 3D-memory package. With such designs, computations of a host CPU can be offloaded to the 3D-memory package. The fabrication of logic layers with the processing logic of a CPU is both complex and expensive.

DETAILED DESCRIPTION

A memory subsystem package is provided that has processing logic for data reorganization within the memory subsystem package. The processing logic is adapted to reorganize data stored within the memory subsystem package. For example, the processing logic may perform a gather operation to collect data from scattered memory locations and store it into contiguous memory locations. A host processor can then retrieve the gathered data and avoid having to retrieve unused data of cache lines as it would if the host processor were to retrieve the data from the scattered memory locations. The memory subsystem package may be a 3D-memory package with a logic layer such as a Hybrid Memory Cube. (See www.hybridmemorycube.org.) In some embodiments, the memory subsystem package includes memory units, a memory interconnect, and a data reorganization engine ("DRE"). The data reorganization engine is implemented in the logic layer and includes a stream interconnect and DRE units including a control processor and a load-store unit. The memory interconnect connects the memory units to DRE units and to a host processor. The stream interconnect connects the DRE units, enabling the DRE units to send data to each other via the stream interconnect. The memory interconnect and the stream interconnect may be high-speed switches. The control processor and the load-store unit are connected to the memory interconnect and to the stream interconnect. The control processor is adapted to execute instructions. The load-store unit is adapted to process data move commands received from the control processor via the stream interconnect for loading data from a load memory address of a memory unit and storing data to a store memory address of a memory unit. For example, the control processor may interact with the load-store unit to perform the gather operation.

Figure 1:
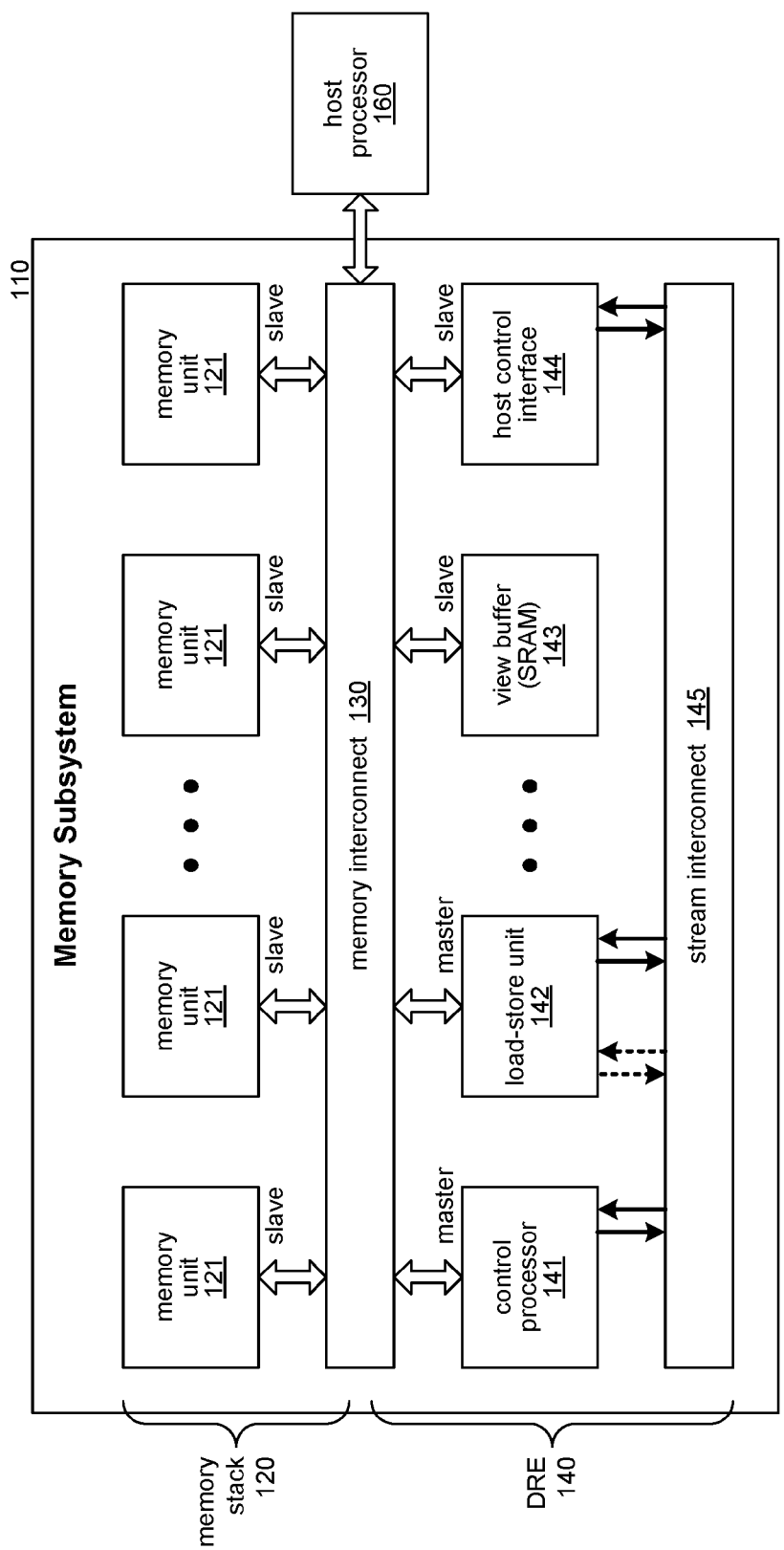
FIG. 1 illustrates the architecture of a memory subsystem package with a data reorganization engine in some embodiments.

FIG. 1 illustrates the architecture of a data reorganization engine in some embodiments. A memory subsystem package 110 includes a memory stack 120, a memory interconnect 130, and a data reorganization engine 140. The memory subsystem package connects to a host processor 160 via the memory interconnect. The memory stack includes memory units 121 that are connected to the memory interconnect as slaves. The data reorganization engine includes a control processor 141, a load-store unit 142, a view buffer 143, a host control interface 144, and a stream interconnect 145. The control processor and load-store unit are connected to the memory interconnect as masters, and the view buffer and host control interface are connected to the memory interconnect as slaves. The control processor, the load-store unit, and the host control interface are connected to the stream interconnect 145 via a control port (illustrated by solid arrow), and the load-store unit is also connected via a data port (illustrated by dashed arrow). Each port includes an input channel and an output channel. The control processor (e.g., a microcontroller) may be programmed with instructions to receive commands from the host processor to perform data reorganizations and issue control commands to the load-store unit to move data of the memory units to effect the reorganization. The instructions may, for example, implement scatter/gather operations or strided memory access operations within the memory subsystem package.

In some embodiments, the DRE units that are masters and the host processor access memory through the memory interconnect using a read-write protocol. The memory interconnect routes requests to access a byte address to the appropriate memory unit to load or store a data. The memory interconnect may be a memory-mapped interface, which is capable of direct loads and stores. The memory interconnect may conform to the Hybrid Memory Cube ("HMC") memory interconnect protocol of Micron Technology, Inc. or the Advanced eXtenstible Interface ("AXI") protocol of ARM Holdings, PLC.

In some embodiments, the stream interconnect provides a medium for transferring control messages and data between DRE units. Data flows in a stream from output channels of ports to input channels of ports through the stream interconnect. Each port has an identifying number that is used by the stream interconnect to route a stream of data to a destination. Flow in the stream from source to destination is controlled at the level of flow control digits ("flits"). If a destination is not ready to receive a flit, backpressure is applied to stall the data transfer. The beginning and end of control messages are indicated by header information or by additional signals in the stream. The stream interconnect may conform to the LocalLink Interface Specification of Xilinx, Inc., the Avalon Streaming Specifications of Altera Corp, and AXI. Examples of stream protocols from industry include Xilinx LocalLink, Altera Avalon-ST, and an AXI-Stream Protocol Specification of ARM Holdings, PLC.

In some embodiments, two types of ports, control ports and data ports, are connected to the stream interconnect. The different types of ports use different techniques to indicate the destination of outgoing data. Control ports use a message header to indicate the destination, whereas data ports have an additional state (implemented as a register) that indicates the destination port. As data leaves a data port via its output channel, the destination register determines the routing through the stream switch. The control processor changes the destination register of the output channel of a load-store unit by sending a control message to the load-store unit. Any data originating from a data port flows to the established destination until changed by another control message. For efficiency, the ports may be connected by separate control and data networks, each optimized for their respective usage patterns.

An example will help illustrate the operation of the data reorganization engine. The host processor may be executing an application that needs to perform a strided retrieval of every 64th byte of an array. If the cache line is 64 bytes, then each retrieval of a cache line would retrieve only one byte that would be used, and the remaining 63 bytes would not be used. To avoid such retrieval of data that would not be used, the host processor requests the data reorganization engine to store a copy of every 64th byte of the array in an array of contiguous memory locations. The host processor then retrieves the data stored in the contiguous memory locations. When requesting the data reorganization engine, the host processor may send a setup command via the memory interconnect to the control processor. The setup command may include the address of an array referred to as a "data buffer," the stride (e.g., 64 bytes), and the element size (i.e., number of bytes in each stride element). The control processor executes instructions to store the information of the setup command. The host processor may then send a fill command to the control processor to fill the view buffer from the data buffer. The fill command may specify the address of the array referred to as a "view buffer" and the amount of the view buffer to fill, which is effectively the view buffer size. The control processor provides the load-store unit with the address of the data buffer as a load address along with the stride, the element size, and a repetition count. The control processor also provides the load-store unit with the address of the view buffer as a store address along with its size. The load-store unit initializes a load address to the address of the data buffer and a store address to the address of the view buffer. If the element size is one byte, then the load-store unit loads the one-byte stride element from the load address and stores the one-byte stride element in the store address and then increments the load address by the stride and increments the store address by one. The load-store unit repeats this processing for the specified repetition count, which may be calculated by the control processor from the view buffer size. When the filling of the view buffer is complete, the control processor signals the host processor via the host control interface that the view buffer is ready to be retrieved by the host processor.

In some embodiments, the data reorganization engine may have a dedicated view buffer such as view buffer 143 for storing the reorganized data. The view buffer may alternatively be a portion of a memory unit designated by the host processor. In the example above, the load-store unit loads data from the data buffer of a memory unit and stores the data in the view buffer 143. The view buffer 143 may be a static random access memory ("SRAM"). The data reorganization engine may also include a host control interface that provides a mechanism for the host processor to communicate with the control processor. For example, a host processor may send commands for the control processor and control programs for execution by the control processor via the host control interface. The control processor may also set flags in the host control interface to signal completion of a command. In some embodiments, the control processor executes a control program that may be stored in non-volatile memory of the data reorganization engine or may be provided by a host processor to dynamically program the operation of the control processor. In some embodiments, the control processor may be a microcontroller such as a Cortex-M3 processor designed by ARM Holdings, PLC or a RISC-V processor specified in "The RISC-V Instruction Set Manual," University of California, Berkley, Tech. Rep. UCB/EECS-2014-54, May 6, 2014.

Figure 2:
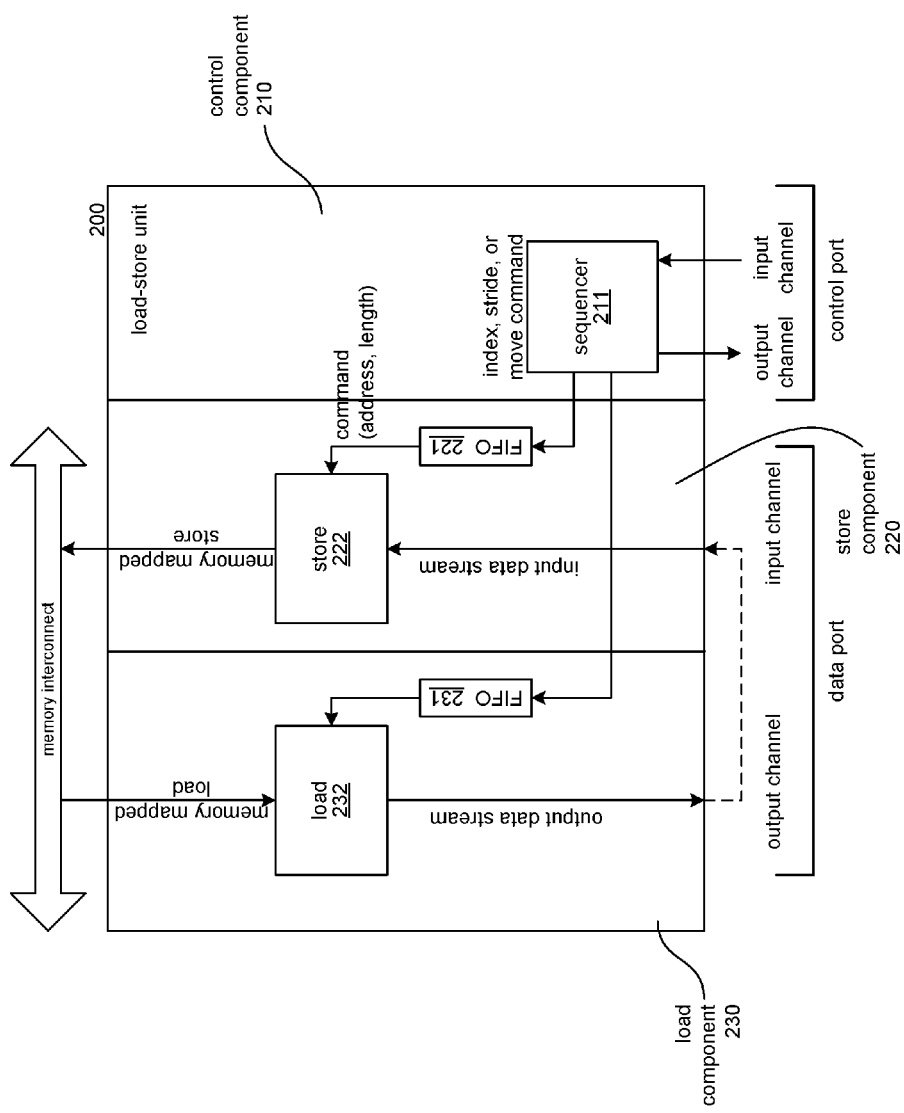
FIG. 2 is a block diagram that illustrates an architecture of a load-store unit in some embodiments.

FIG. 2 is a block diagram that illustrates an architecture of a load-store unit in some embodiments. A load-store unit 200 includes a control component 210, a load component 230, and a store component 220. The control component includes a sequencer 211, the store component includes a store FIFO 221 and a store module 222, and the load component includes a load FIFO 231 and a load module 232. The sequencer may include a load subcommand generator and a store subcommand generator. The load and store subcommand generators may perform the same functions except that the store subcommand generator provides subcommands to the load component of the load-store unit and the store subcommand generator provides subcommands to the store component of the load-store unit. Each subcommand specifies an address and number of bytes. Each subcommand generator may also include a bank of registers for storing a command, a base address, an element size, an index or stride, a repetition count, and so on. The command indicates whether the data reorganization for the subcommand generator is to be contiguous, strided, or index (e.g., receive indexes for a scatter or gather operation).

The subcommand generators generate addresses based on the content of the registers. Continuing with the example of strided access to an array of elements, the load-store unit receives two messages. The first message may direct the store subcommand generator to load its command register to indicate contiguous, its base address register with the address of the view buffer, and its size register with the number of bytes to be moved and then to start generating destination addresses. The second message may direct the load subcommand generator to load its command register to indicate strided, its base address register with the address of the data buffer, its element size register with the element size of the data buffer, its stride register with the stride, and its repetition register with the repetition count and then to start generating source addresses. In response to the indication to start, the load subcommand generator generates a sequence of load subcommands for sequentially loading each element of the data buffer. Each of the subcommands includes the address of the next element and the element size. In response to the indication to start, the store subcommand generator also generates a store subcommand that includes the base address of the view buffer and the transfer size. The sequencer pushes each load subcommand onto the load FIFO and each store subcommand onto the store FIFO. The load module pulls each load subcommand from the load FIFO and, for each load subcommand, loads the specified number of bytes starting from the address of the subcommand and outputs the data via the output channel of the data port. When the store module receives data via the input channel of the data port, the store module pulls a store subcommand from the store FIFO and stores the specified number of bytes that it receives starting at the address of the subcommand. For each subcommand that it pulls, the load module and the store module generate contiguous addresses starting at the base address and continuing for the specified number of bytes and perform a direct memory access ("DMA") read from or write to the generated addresses.

FIG. 2 illustrates an example of looping back the output data stream of the load-store unit to the input data stream. To effect the looping back of the data port, both the output channel and the input channel can be connected to the stream interconnect and the control processor can set the destination of the output channel to be the input channel. Alternatively, the output channel of the data port can be connected directly to the input channel without the data port being connected to the stream interconnect. In this example, the data flows from the source to the destination without modification.

Figure 3:
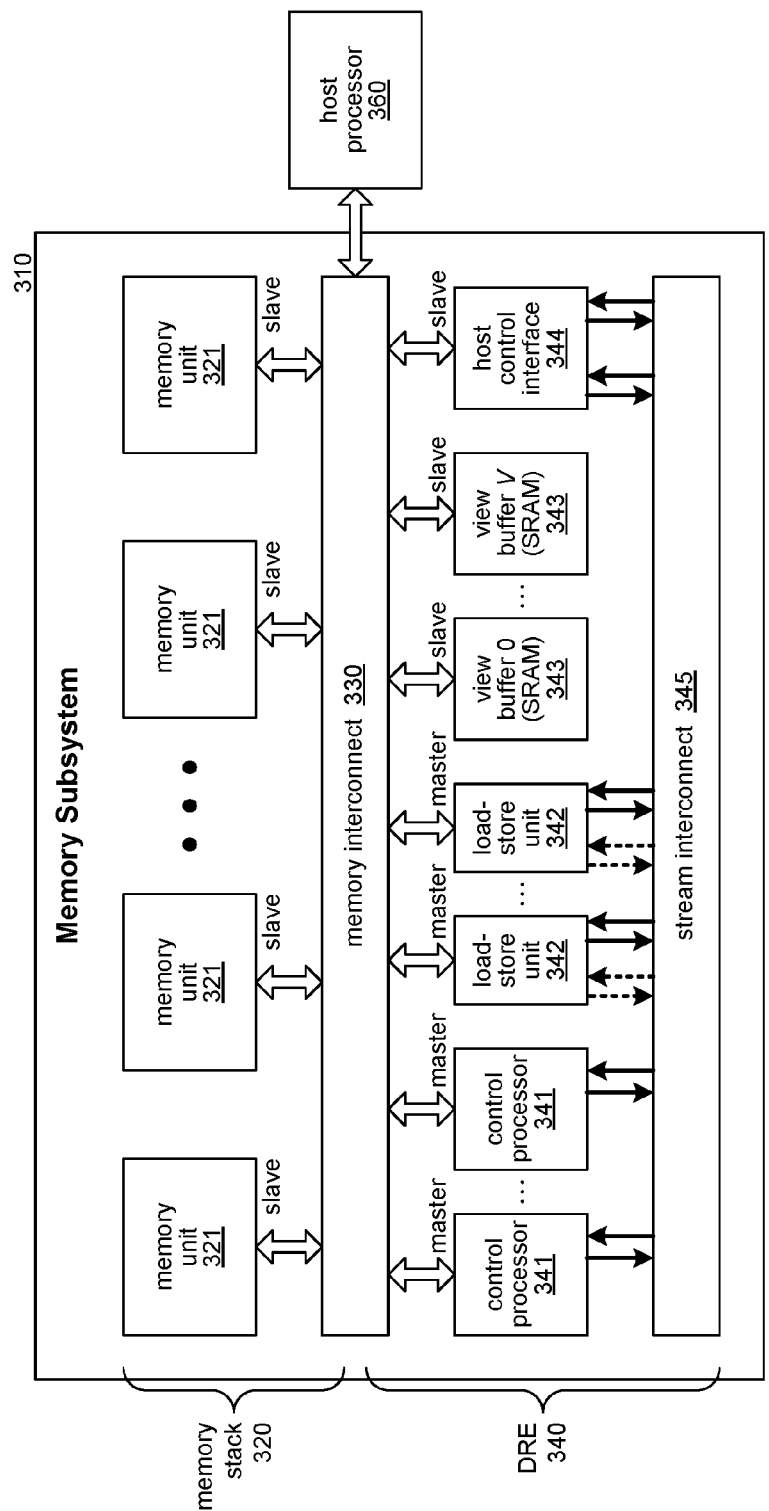
FIG. 3 is a block diagram that illustrates a memory subsystem package with multiple control processors, load-store units, and view buffers in some embodiments.

FIG. 3 is a block diagram that illustrates a memory subsystem package with multiple control processors, load-store units, and view buffers in some embodiments. A memory subsystem package 310 includes a memory stack 320, a memory interconnect 330, and a data reorganization engine 340. The memory subsystem package is connected to host processor 360 via the memory interconnect. The data reorganization engine includes control processors 341, load-store units 342, view buffers 343, a host control interface 344, and a stream interconnect 345. Multiple control processors and load-store units can be used together to perform a reorganization in parallel. For example, to perform the gathering of data whose locations are identified by an array of indexes in a data buffer, a control processor may request a first load-store unit to load the indexes from the array of indexes and stream the indexes to a second load-store unit and to store data that is streamed to it in a view buffer. The control processor may request the second load-store unit to add each received index to a base address of the data buffer, load data from that address, and stream the loaded data to the first data buffer. This assumes that the sequencer can be configured to add the indexes received to the base address of the data buffer and push the result onto the load FIFO.

Figure 4:
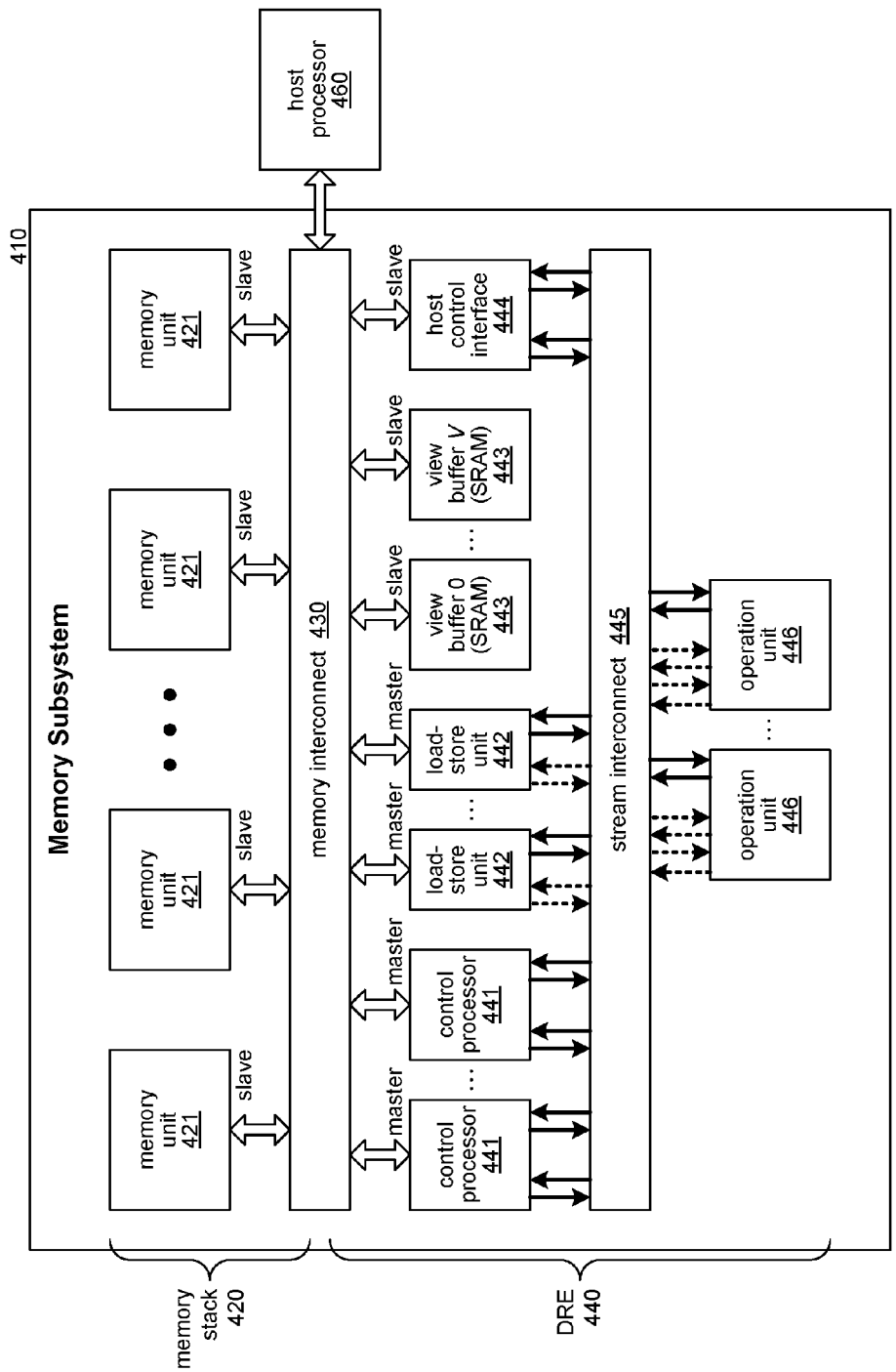
FIG. 4 is a block diagram that illustrates a memory subsystem package with multiple control processors, load-store units, view buffers, and operation units in some embodiments.

FIG. 4 is a block diagram that illustrates a memory subsystem package with multiple control processors, load-store units, view buffers, and operation units in some embodiments. A memory subsystem package 410 includes a memory stack 420, a memory interconnect 430, and a data reorganization engine 440. The data reorganization engine includes control processors 441, load-store units 442, view buffers 443, a host control interface 444, operation units 446, and a stream interconnect 445. Each operation unit is adapted to perform a certain operation such as mathematical operations (e.g., add, multiply, and summation), Boolean operations (e.g., logical AND), bit manipulation operations (e.g., shift, mask bits, and count), encryption operations (e.g., public/private key encryption and decryption), and so on. A control processor can direct streams of elements to be sent from load-store units to operation units and streams of results of the operations to be sent to a load-store unit for storage or to one or more other operation units for further processing.

Figure 5:
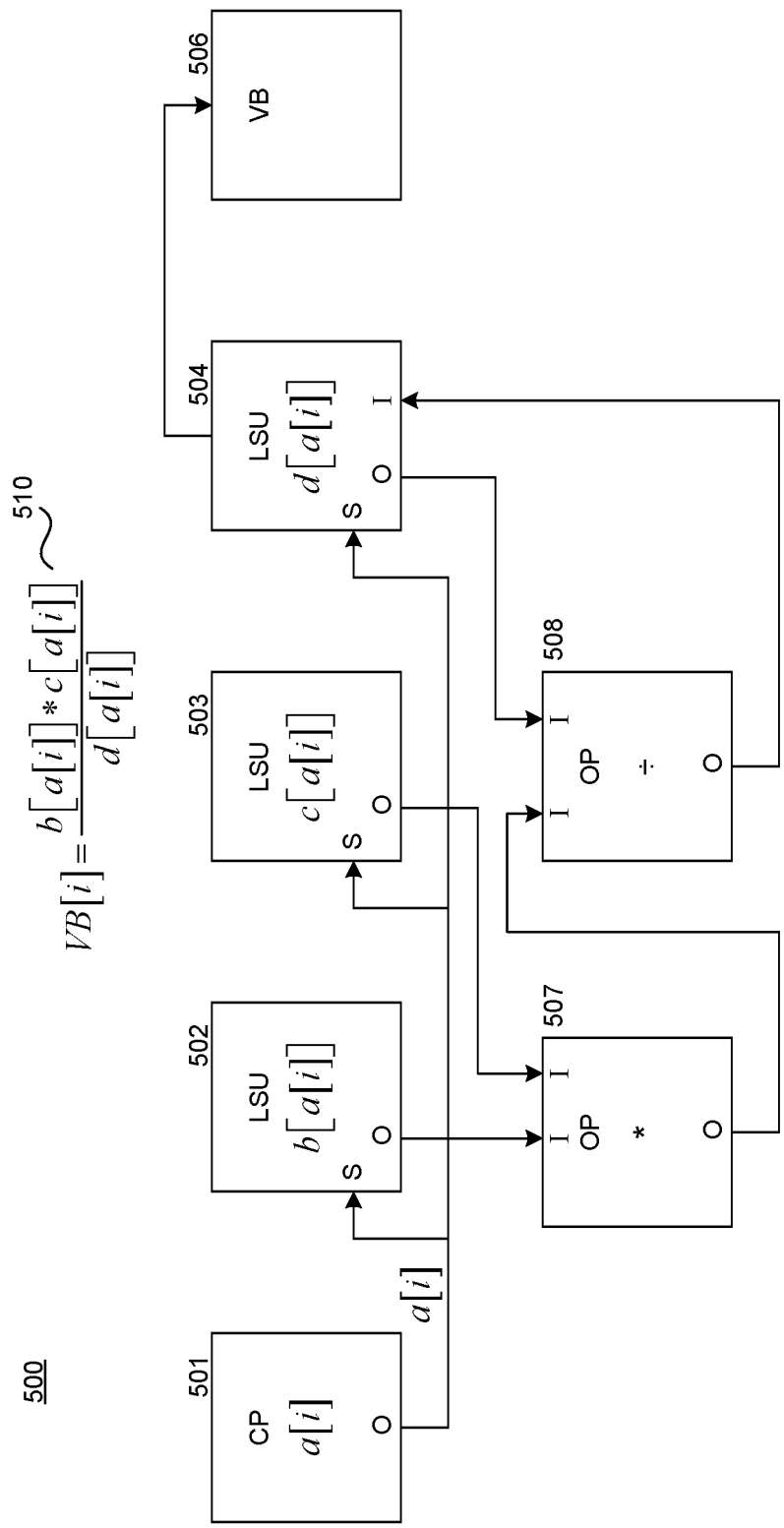
FIG. 5 is a block diagram that illustrates use of operation units to implement an example function in some embodiments.

FIG. 5 is a block diagram that illustrates use of operation units to implement an example function in some embodiments. An example function 510 multiplies corresponding elements of arrays B and C and divides each product by the corresponding elements of array D. Arrays B, C, and D are indexed by elements of array A. A control processor ("CP") 501 initially configures load-store units ("LSUs") 502, 503, and 504 to load elements of an array from the sum of the base address of the array and indexes received via the sequencer. The control processor also configures load-store unit 504 to store data received via the input channel of its data port in a view buffer ("VB") 506. The control processor configures load-store units 502 and 503 to stream the loaded elements via the output channel of its data port to the input channel of the data port of a multiply operation unit 507 and load-store unit 504 to stream the loaded elements via the output channel of its data port to the input channel of the data port of a divide operation unit 508. The control processor also commands multiply operation unit ("OP") 507 to stream its results via the output channel of its data port to the input channel of the data port of the divide operation unit 508 and divide operation unit 508 to stream its results via the output channel of its data port to the input channel of the data port of load-store unit 504. The control processor 501 then retrieves the elements from array A and sends the elements to the sequencers of load-store units 502, 503, and 504. In operation, as each index value is received by the sequencers of load-store units 502, 503, and 504, an element of arrays B, C, and D is loaded from memory and provided to the operation units, and the result of the function 510 is stored in the view buffer 506 by load-store unit 504.

In some embodiments, the control information sent by the control processor to a load-store unit or an operation unit may include a header and a payload portion. The header identifies a source unit and a destination unit (e.g., via port numbers), and the payload contains the control information. The control information may indicate a start memory address and the number of bytes for a read or write request and may include a destination for a read request. To transfer data from a source unit to a destination unit, a control processor sends read control information of a read request to the source unit and write control information of a write request to the destination unit. The source unit responds to the read request by loading data starting from its start memory addresses and streaming the data via the output channel of its data port to the input channel of the data port of the destination unit. The destination unit responds to the write request by receiving data via the input channel of its data port and storing the data starting at its start memory address. The source and destination units may also send a response to the control processor via the output channel of their control ports.

A control processor may use the output channel of its control port to provide control information to the sequencer of a load-store unit. For example, to perform a strided operation, a control processor sends to a load-store unit control information that includes the address of the data buffer, stride, stride element size, address of the view buffer, view buffer size, and direction of the move. The load-store unit may indicate completion of the strided operation via the output channel of its control port. As described above, the output channel and the input channel of the data port of a load-store unit may be connected to the stream interconnect, or the output channel of a data port of a load-store unit may be directly connected to its own input channel of the data port without being connected to the steam interconnect. As an example, if the data reorganization engine includes operation units, then the data ports of the load-store units may be connected to the stream interconnect so that data can be streamed from the output channels of the load-store units to the input channels of the data ports of operation units and from the output channels of operation units to the input channels of the data ports of the load-store units. To send data from a load-store unit to an operation unit, a control processor may send a read request to the load-store unit that includes as a destination of the read request the data port number of the operation unit. The control processor may also send a control message to the operation unit indicating the data port to which the operation unit is to send the results of the operation. The control message may include other control information such as an encryption key to use for encrypting or decrypting, mathematical operations to perform, and so on.

Figure 6:
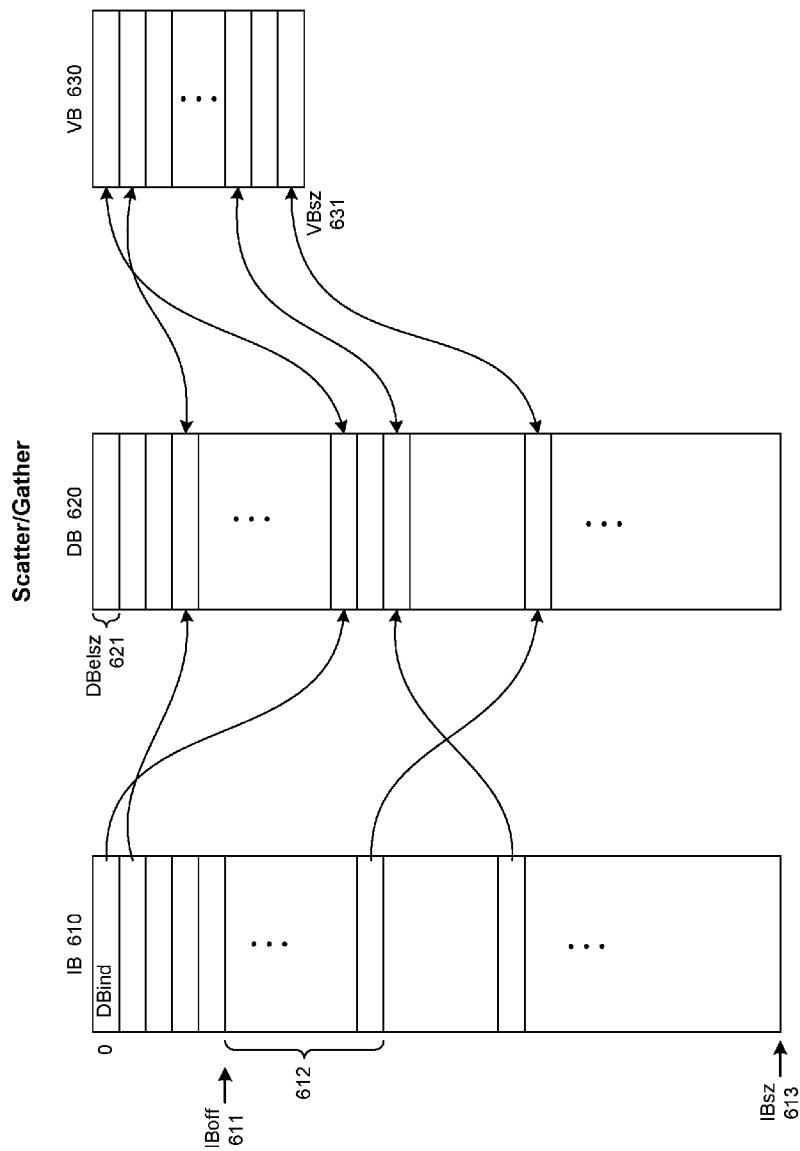
FIG. 6 illustrates terms used in a scatter/gather operation.

FIG. 6 illustrates terms used in a scatter/gather operation. Index buffer ("IB") 610 contains the indexes ("DBind") for the data buffer ("DB") 620 whose elements are to be stored in or loaded from the view buffer ("VB") 630. Index buffer offset ("IBoff") 611 is the offset within the index buffer of the indexes for an operation. The index buffer size ("IBsz") 613 represents the size of the index buffer. View buffer size ("VBsz") 631 represents the number of elements in the view buffer. Each element has a data buffer element size ("DBelsz") 621. For a gather operation, the elements of the data buffer indexed by the index buffer starting at the index buffer offset are stored in sequential elements in the view buffer. For a scatter operation, the elements of the view buffer are stored in the elements of the data buffer indexed by the index buffer starting at the index buffer offset. If the view buffer is not large enough to store all the data, the host processor can send multiple commands to fill the view buffer using different index buffer offsets to indicate the portion of the index buffer to use. The control processor uses the view buffer size to determine when an operation is complete, that is, a view buffer size amount of data is moved with a fill or a drain command.

Figure 7:
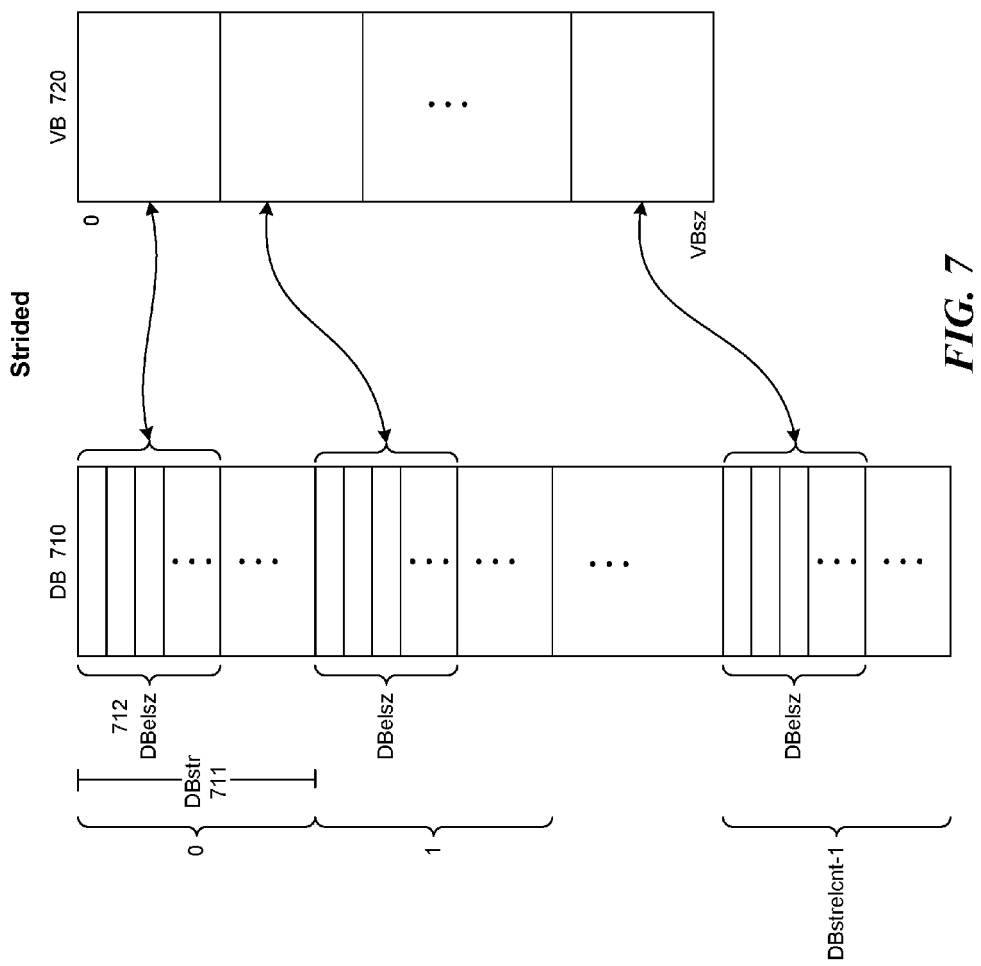
FIG. 7 illustrates terms used in a strided operation.

FIG. 7 illustrates terms used in a strided operation. A data buffer 710 has stride elements to be stored in or loaded from the view buffer 720. The strided operation has a data buffer stride ("DBstr") 711 that indicates the number of data buffer elements between stride elements. A data buffer stride element size ("DBelsz") 712 indicates the number of data buffer elements in each stride element. A strided operation may store successive stride elements contiguously in the view buffer 720 or from contiguous locations in the view buffer in the data buffer. Alternatively, the successive stride elements from the data buffer may be stored in the view buffer using a stride that may be the same as or different from the stride of the data buffer. The successive stride elements from the data buffer may also be stored in the view buffer using an index of a scatter operation.

Figure 8:
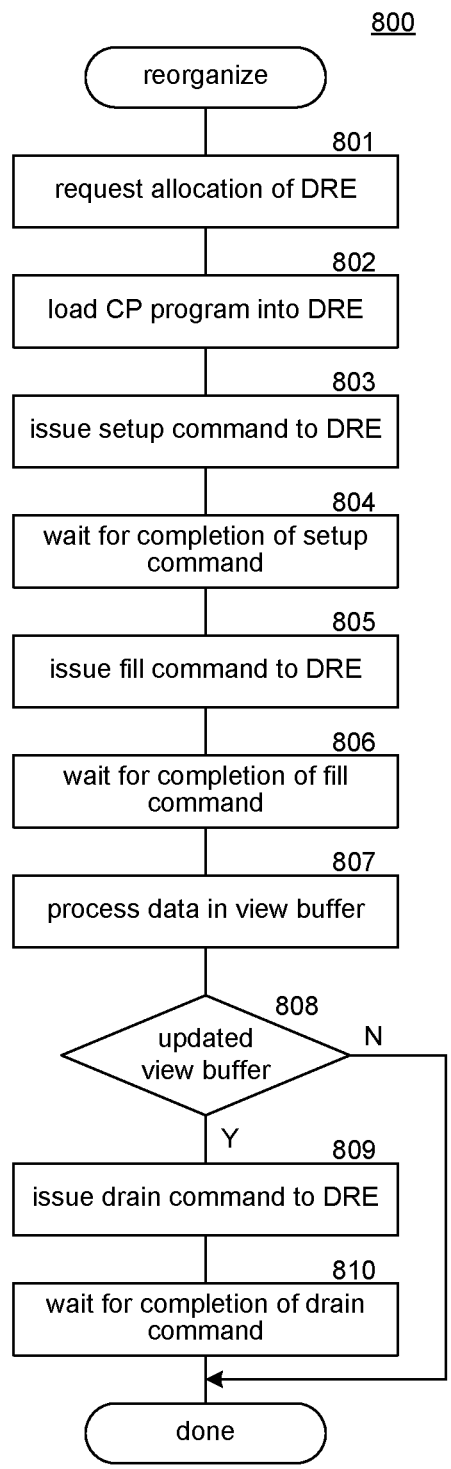
FIG. 8 is a flow diagram that illustrates usage of a data reorganization engine to reorganize data of an application in some embodiments.

FIG. 8 is a flow diagram that illustrates usage of a data reorganization engine to reorganize data of an application in some embodiments. A reorganize component 800 of the application may be invoked to move data of a data buffer into a view buffer, process the data in the view buffer, and move the processed data of the view buffer back into the data buffer. In block 801, the component may request an allocation of a data reorganization engine by the operating system. The request may include the number of control processors, load-store units, and operation units needed for the reorganization. The operating system may allocate a complete data reorganization engine to the application or may allocate a portion of a reorganization engine to the application. In block 802, the component directs the operating system to load a control program into the data reorganization engine. The control program is the program that the control processor executes to effect the data reorganization. In some embodiments, the operating system itself may specify a set of control programs that can be loaded. Alternatively, each application may specify its own control programs. In block 803, the application issues a setup command to the data reorganization engine. The parameters of the setup command are specific to the control program and the type of reorganization. For example, if the reorganization is a strided operation, then the parameters may be the base address of the data buffer, the stride, and the stride element size. In block 804, the application waits for completion of the setup command. In block 805, the application then issues a fill command to the data reorganization engine. A fill command specifies the base address of the view buffer and indicates that the data reorganization engine should fill the view buffer from the elements of the data buffer specified in the setup command. For example, if the reorganization is a strided operation, the parameters of the fill command may include the view buffer size and a data buffer offset within the data buffer of the first stride element to copy. In response to the fill command, the data reorganization engine fills the view buffer with the stride elements. In block 806, the application waits for completion of the fill command. To determine whether a fill command has been completed, the operating system or application may periodically check a flag provided by the host control interface of the data reorganization engine. Alternatively, the host control interface may employ an event notification mechanism to send an event notification that causes the operating system or application to execute code to process the completion of the data reorganization. In block 807, the application processes the data in the view buffer. In decision block 808, if the data in the view buffer has been modified, then the application continues at block 809, else the reorganization is complete. In block 809, the application issues a drain command to the data reorganization engine. In block 810, the application waits for completion of the drain command and then the reorganization is complete. A drain command indicates that the data reorganization engine should store the data of the view buffer back in the data buffer indicated by the last setup command. The drain command may include the same parameters as a fill command. In some embodiments, before draining a buffer, the application program may issue a new setup command designating a different data buffer to which the view buffer is to be drained.

If the host processor uses virtual addresses, the control processor may include a memory management unit ("MMU") that uses an address translation table that mirrors that of the host processor for translating virtual addresses to physical address. (See, e.g., R. Nair, S. Antao, C. Bertolli, P. Bose, et. al., "Active Memory Cube: A Processing-In-Memory Architecture for Exascale Systems," IBM Journal of Research and Development, 59(2/3):17:1-17:14, March-May, 2015, which is hereby incorporated by reference.) Alternatively, a custom allocator allocates pages of a large contiguous range of physical memory, pins the pages so they are not swapped out, and communicates the physical base address of this contiguous memory to the data reorganization system. The application buffers used by the data reorganization engine are stored in the allocated pages. Buffer addresses passed to a data reorganization engine are relative to the base address. When accessing memory, the data reorganization system adds that base address to each buffer address provided by the host processor.

Figure 9:
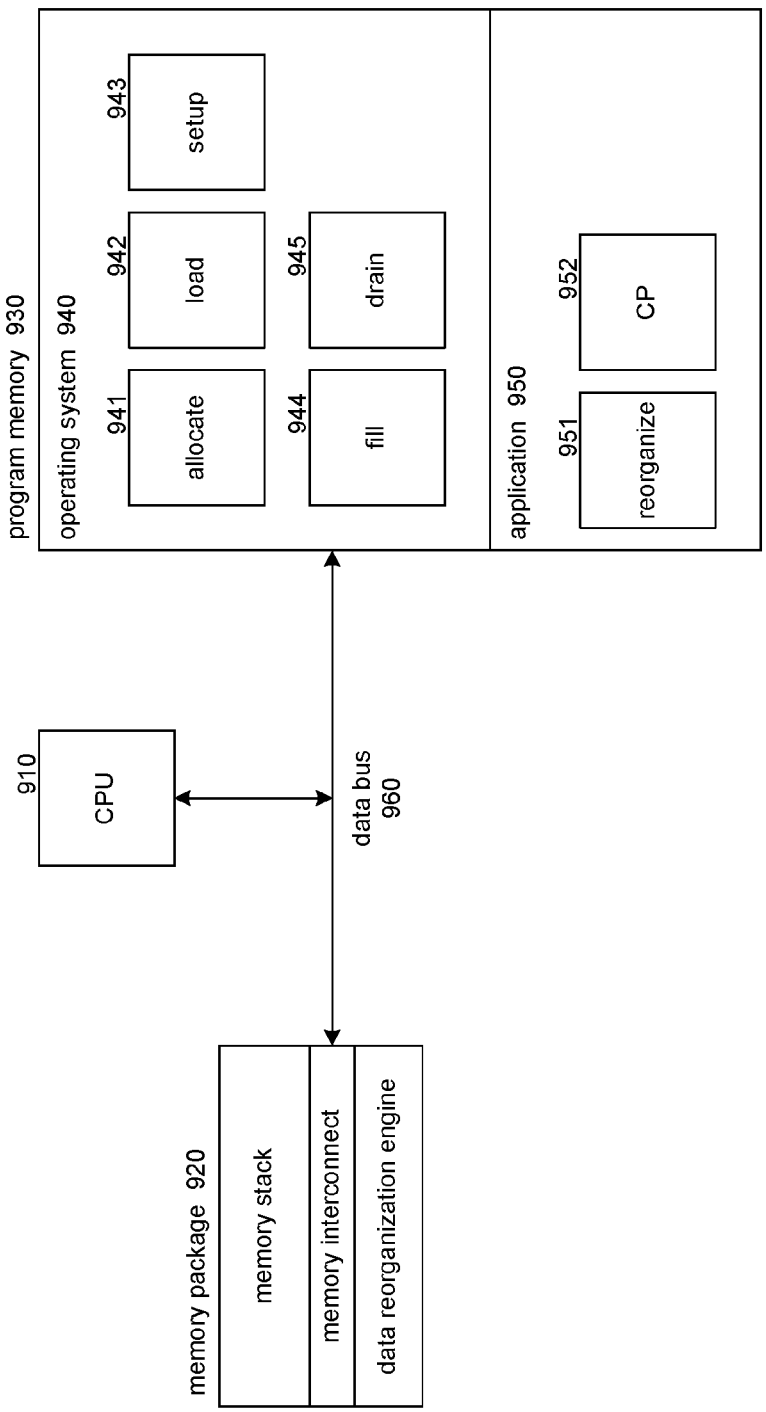
FIG. 9 is a block diagram that illustrates components of an application program interface for a data reorganization engine in some embodiments.

FIG. 9 is a block diagram that illustrates components of an application program interface for a data reorganization engine in some embodiments. A CPU 910 is connected to a memory package 920 and program memory 930 via data bus 960. The memory package 920 includes a memory stack, a memory interconnect, and a data reorganization engine. The program memory includes components of an operating system 940 and an application 950. The components of the operating system that implement the application program interface of a data reorganization engine are an allocate component 941, a load component 942, a setup component 943, a fill component 944, and a drain component 945. The application includes a reorganize component 951 and a control program 952. The application programming interface may be specified as followed. The buffers are passed by passing their base address. In some embodiments, rather than the parameters of the setup, fill, and drain components being individual formal arguments, the parameters may be stored in a data structure that is passed to the control processor. The operating system need not know the internal structure of the data structure. If the operating system does not know the internal structure, then the application program may need to direct the flushing and invalidating of cache to ensure coherency between memory and cache for buffers used in a data reorganization.

Application Programming Interface
General
DRE=Allocate (CPcnt, LSUcnt, OPcnt)
DRE::Load (CP)
Scatter/Gather Operation
DRE::setup (DB, DBelsz, IB, IBsz, Scatter/Gather)
DRE::fill (VB, VBsz, IBOff)
DRE::drain (VB, VBsz, IBOff)
Strided Operation
DRE::setup (DB, DBstr, DBelsz, Stride)
DRE::fill (VB, VBsz, DBoff)
DRE::drain (VB, VBsz, DBoff)
Strided Operation with Summation Operation
DRE::setup (DB, DBstr, DBelsz, Summation)
DRE::fill (VB, VBsz, DBoff)
DRE::drain (VB, VBsz, DBoff)
Strided Operation with Addition Operation
DRE::setup (DB1, DBstr1, DBelsz1, DB2, DBstr2, DBelsz2, Add)
DRE::fill (VB, VBsz, DBoff)
DRE::drain (VB, VBsz, DBoff)

FIGS. 10-19 illustrate processing to perform a gather operation and then a scatter operation using an index buffer in some embodiments. In these embodiments, an application invokes components of an operating system executing on a host processor. The operating system downloads a control program to a control processor to coordinate the gather and scatter operations.

Figure 10:
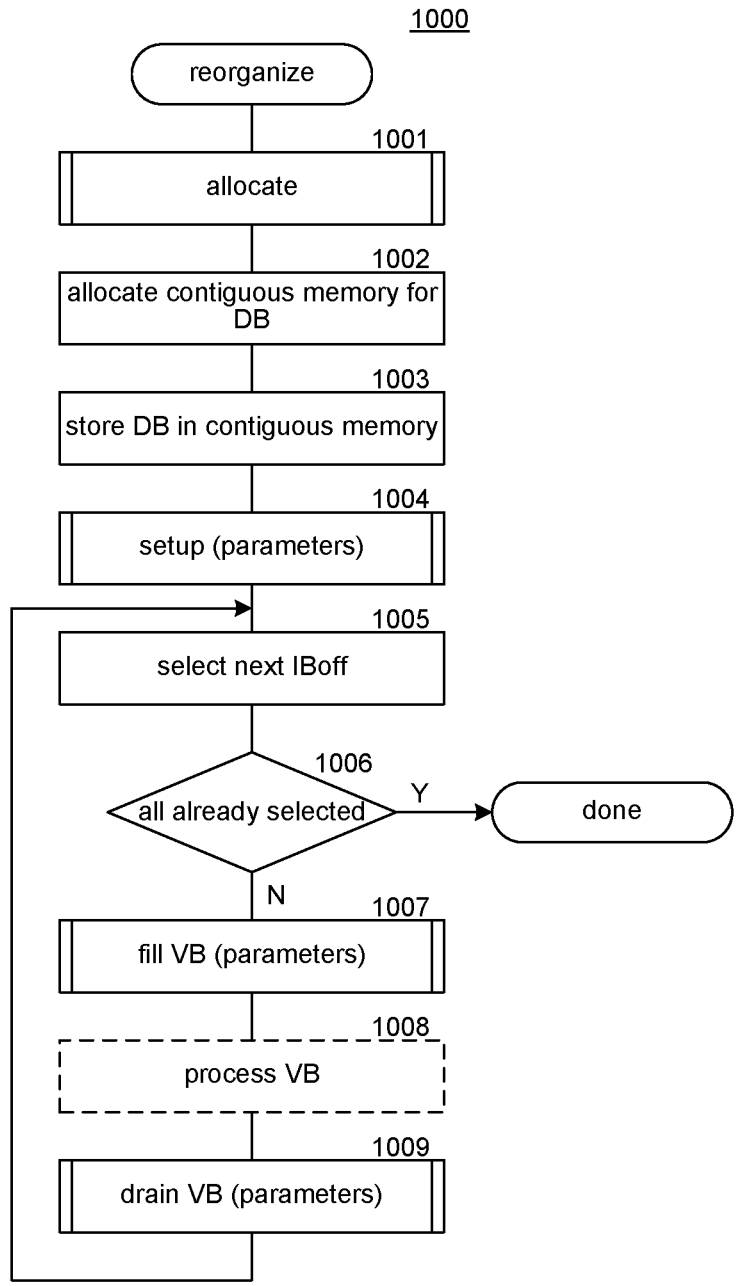
FIG. 10 is a flow diagram illustrating a reorganize component of an application to implement a gather and a scatter operation in some embodiments.

FIG. 10 is a flow diagram illustrating a reorganize component of an application to implement a gather and a scatter operation in some embodiments. In block 1001, the reorganize component 1000 invokes an allocate component of the operating system to allocate a data reorganization engine to the application. In block 1002, the component allocates contiguous memory for the data buffer to help facilitate mapping of virtual addresses to physical addresses. In block 1003, the component stores the data in the data buffer. In block 1004, the component invokes a setup component passing the parameters for the data reorganization. The parameters include the data buffer, the element size, the index buffer, and index buffer size. In block 1005, the component selects the offset within the index buffer of the next offset to be processed. In decision block 1006, if all the offsets have already been selected, then the component completes, else the component continues at block 1007. In block 1007, the component invokes a fill component passing parameters for filling the view buffer with data from the data buffer. The parameters include the view buffer, the size of the view buffer, and the offset into the index buffer. The fill component returns when the fill is complete. In block 1008, the component processes the data in the view buffer. In block 1009, the component invokes a drain component passing parameters for draining the view buffer into the data buffer. The parameters include the view buffer, the size of the view buffer, and the offset into the index buffer. The component then loops to block 1005 to select the next offset within the index buffer.

Figure 11:
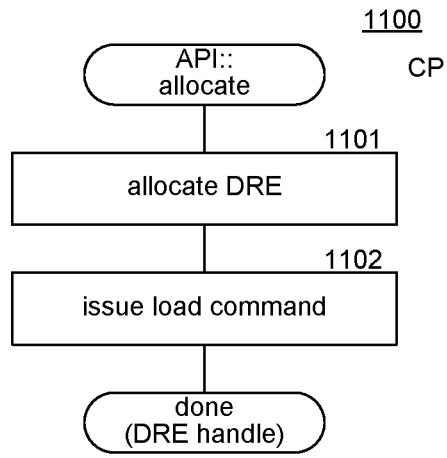
FIG. 11 is a flow diagram that illustrates the processing of an allocate component in some embodiments.

FIGS. 11-14 are flow diagrams that illustrate components of an application programming interface implementing scatter/gather operations in some embodiments. In these embodiments, the element size of the data buffer is one. FIG. 11 is a flow diagram that illustrates the processing of an allocate component in some embodiments. In this example, the allocate component 1100 is passed a control program and allocates a data reorganization engine and downloads the control program to the control processor of the data reorganization engine. Alternatively, the application programming interface may include a separate load component for downloading a control program. In block 1101, the component allocates a data reorganization engine. For example, the component may maintain a list of available control processors and load-store units of various data reorganization engines and may allocate a number requested by an application program. In block 1102, the component issues a load command to the allocated control processor to load the control program and then returns a handle or reference to an object that identifies the allocated data reorganization engine. The commands and the control program may be sent to the data reorganization engine via the host control interface. The host control interface sends the commands and the control program to the control processor via the stream interconnect.

Figure 12:
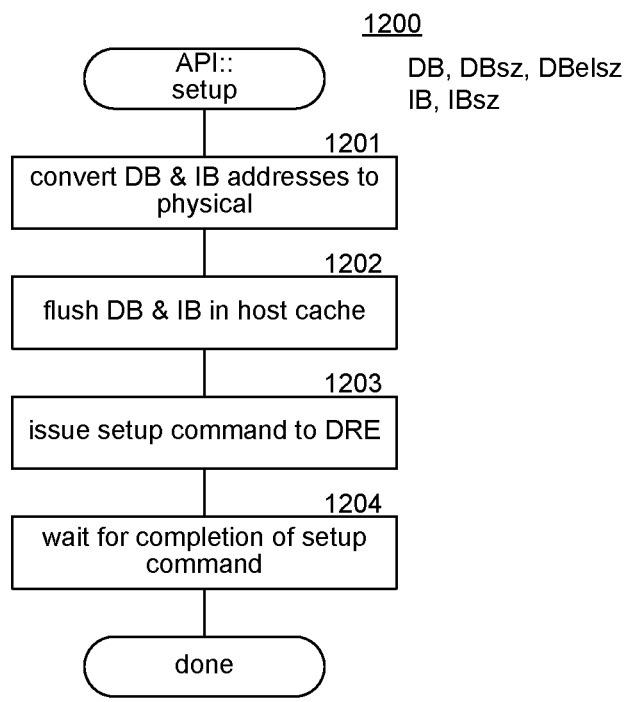
FIG. 12 is a flow diagram that illustrates the processing of a setup component in some embodiments.

FIG. 12 is a flow diagram that illustrates the processing of a setup component in some embodiments. A setup component 1200 is passed a data buffer, a data buffer size, a data buffer element size, an index buffer, and an index buffer size. These parameters may additionally be used to flush the buffers from cache. In block 1201, the component may convert the base addresses of the data buffer and the index buffer from a virtual address to a physical address relative to the base address of the pinned pages. In block 1202, the component flushes the data buffer of the data buffer size and the index buffer of the index buffer size from cache of the host processor to ensure that the in-memory data buffer and index buffer contain the most current data. In block 1203, the component issues a setup command to the control processor of the data reorganization engine passing an indication of the data buffer, the index buffer, and their sizes. In block 1204, the component waits for completion of the setup command and then completes.

Figure 13:
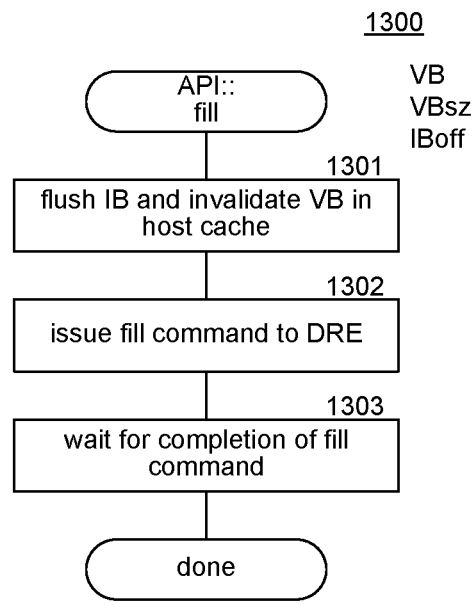
FIG. 13 is a flow diagram that illustrates the processing of a fill component in some embodiments.

FIG. 13 is a flow diagram that illustrates the processing of a fill component in some embodiments. A fill component 1300 is passed a view buffer, a view buffer size, and an index buffer offset. In block 1301, the component flushes and invalidates the view buffer in the cache of the host processor. In block 1302, the component issues a fill command to the control processor of the data reorganization engine passing the view buffer, view buffer size, and index buffer offset. In block 1303, the component waits for completion of the fill command and then completes. The component may periodically check the host control interface of the data reorganization engine to determine whether the control processor has set a flag signaling completion of the fill command.

Figure 14:
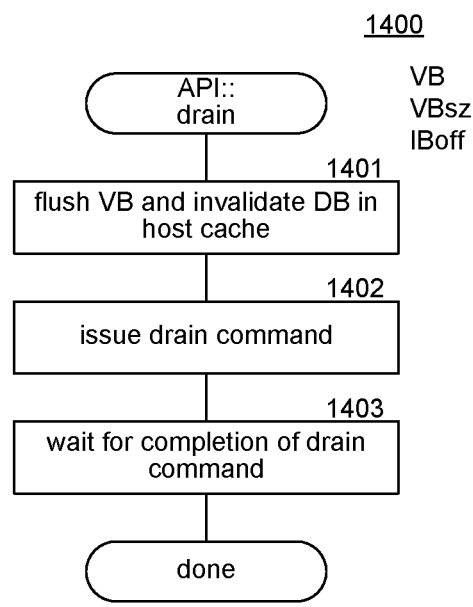
FIG. 14 is a flow diagram that illustrates the processing of a drain component in some embodiments.

FIG. 14 is a flow diagram that illustrates the processing of a drain component in some embodiments. The drain component 1400 is passed a view buffer, a view buffer size, and an index buffer offset. In block 1401, the component flushes the view buffer from and invalidates the data buffer from the cache of the host processor to ensure that the in-memory view buffer contains the current data of the view buffer and that the data buffer is retrieved from memory after the drain completes. In block 1402, the component issues a drain command to the control processor of the data reorganization engine passing the view buffer, view buffer size, and index buffer offset. In block 1403, the component waits for completion of the drain command and then completes. The component may periodically check the host control interface to determine whether the control processor has set a flag signaling completion of the drain command.

Figure 15:
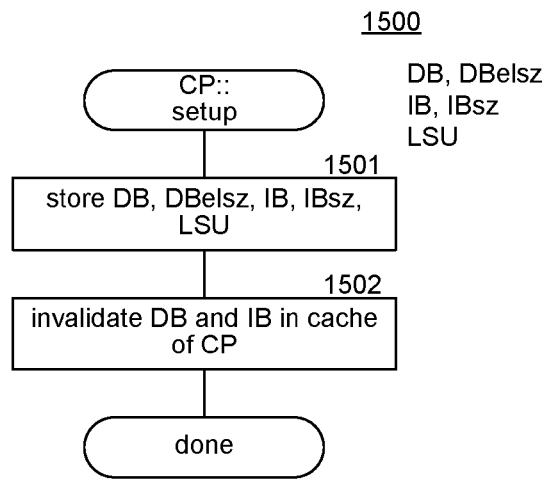
FIG. 15 is a flow diagram that illustrates the processing of a setup component in some embodiments.
Figure 16:
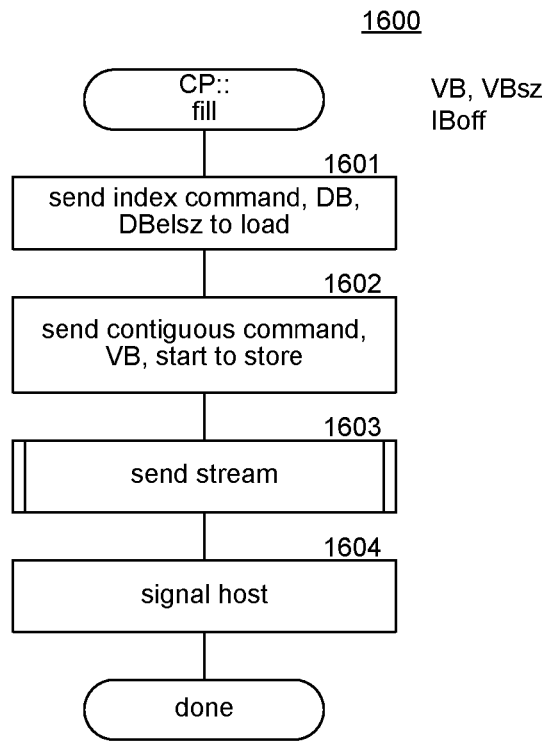
FIG. 16 is a flow diagram that illustrates the processing of a fill component in some embodiments.
Figure 17:
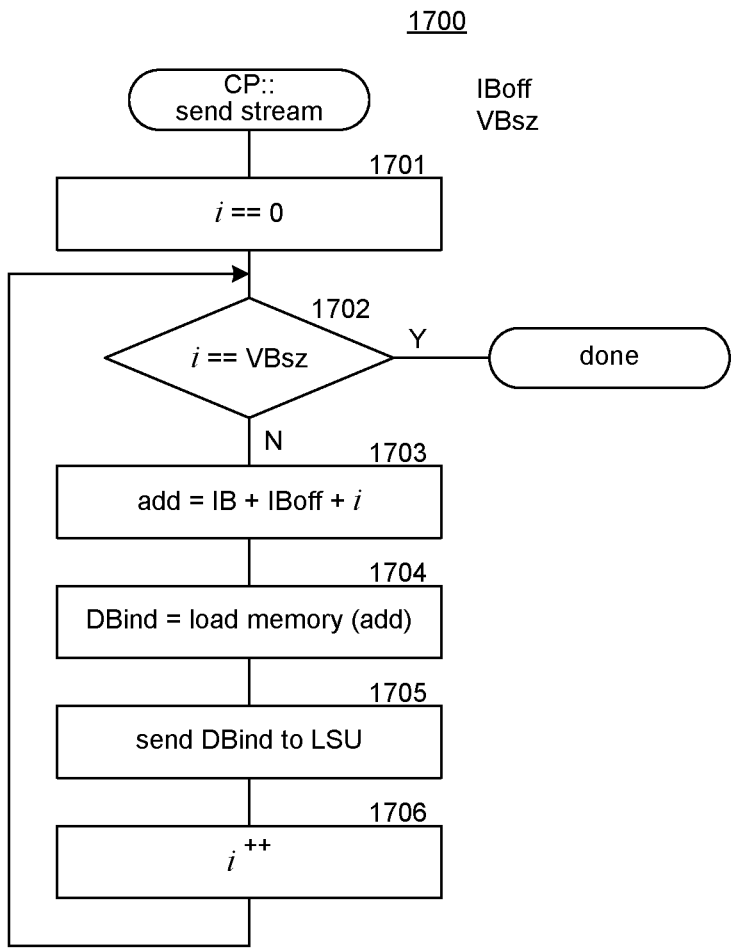
FIG. 17 is a flow diagram that illustrates the processing of a send stream component in some embodiments.

FIGS. 15-17 are flow diagrams that illustrate the processing of components of a control program that is executed by the control processor in some embodiments. FIG. 15 is a flow diagram that illustrates the processing of a setup component in some embodiments. A setup component 1500 is passed a data buffer, data buffer element size, an index buffer, index buffer size, and an indication of a load-store unit to use in the scatter/gather operation. In block 1501, the component stores the data buffer, data buffer element size, index buffer, index buffer size, and indication of the load-store unit. In block 1502, the component invalidates the data buffer and index buffer in the cache of the control processor and then completes.

FIG. 16 is a flow diagram that illustrates the processing of a fill component in some embodiments. A fill component 1600 is passed a view buffer, a view buffer size, and an index buffer offset. In block 1601, the component sends to the load subcommand generator of the load-store unit a message indicating to generate indexed addresses, the data buffer address, and the data buffer element size. In block 1602, the component sends to the store subcommand generator of the load-store unit a message indicating to generate contiguous addresses, the view buffer address, a transfer size, and to start generating addresses. In block 1603, the component invokes a send stream component passing the index buffer offset to send a stream of indexes to the load-store unit from the index buffer starting at the index buffer offset. In block 1604, the component sets a completion flag in the host control interface to signal completion of the operation and then completes. A drain component operates in analogous manner except for sending data sent to the load subcommand generator to the store subcommand generator and vice versa.

FIG. 17 is a flow diagram that illustrates the processing of a send stream component in some embodiments. A send stream component 1700 is passed an indication of the index buffer offset and view buffer size and sends a stream of data from the index buffer to the load-store unit. In block 1701, the component initializes a counter. In decision block 1702, if the number of indexes streamed equals the view buffer size, then the component completes, else the component continues at block 1703. In block 1703, the component calculates the address that stores the next index to be sent to the load-store unit as the sum of the index buffer base address, the index buffer offset, and the count. In block 1704, the component loads the index from the calculated address. In block 1705, the component sends the index to the load-store unit. In block 1706, the component increments the count and loops to block 1702 to determine whether the stream is complete.

Figure 18:
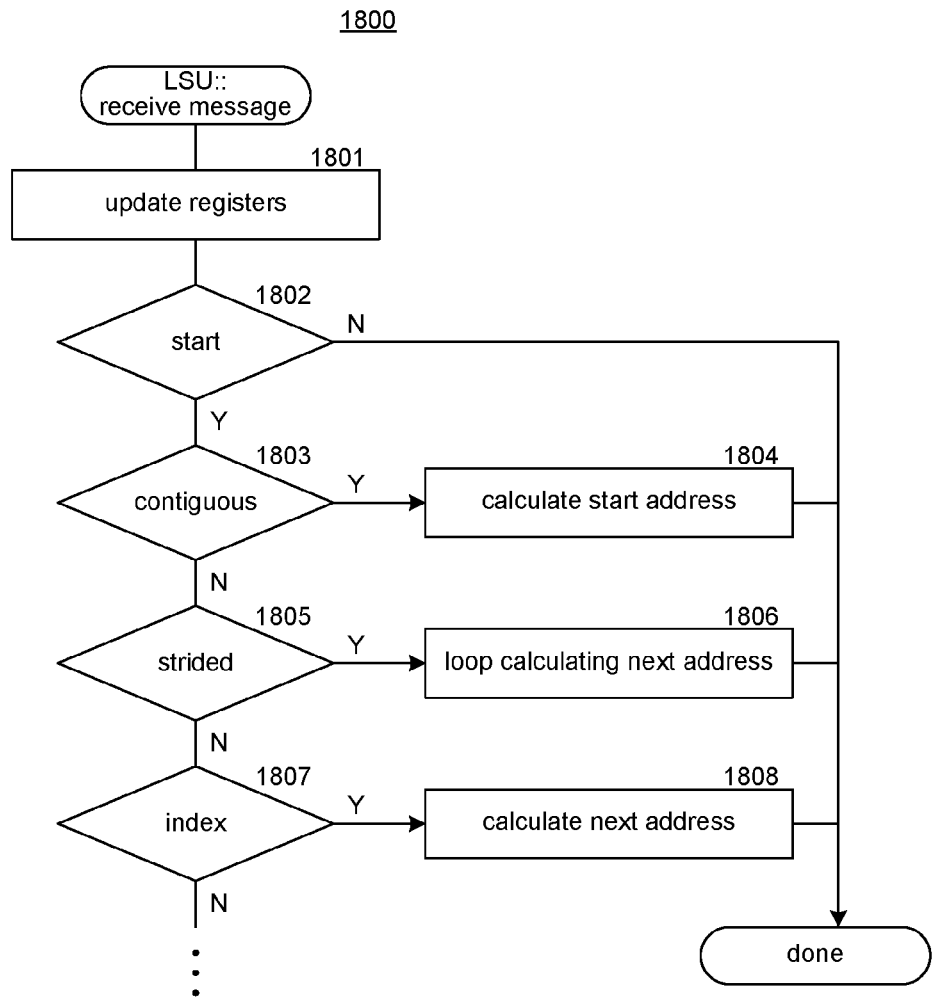
FIG. 18 is a flow diagram that illustrates processing of load or store subcommand generator of a load-store unit in some embodiments.

FIG. 18 is a flow diagram that illustrates processing of a source subcommand generator or a destination subcommand generator of a sequencer of a load-store unit in some embodiments. A subcommand generator 1800 starts processing when a message is received from the control processor. In block 1801, the subcommand generator updates its registers as specified by the message. For example, if the message indicates that the subcommand generator is to perform a strided operation, then the message may indicate a strided command, a base address, an element size, a stride, and a repetition count, which are stored in their respective registers. In decision block 1802, if the message also indicates that the subcommand generator should start generating addresses, the subcommand generator continues at block 1803, else the subcommand generator waits to receive the next message. In decision block 1803, if the command is contiguous, then the subcommand generator continues at block 1804, else the subcommand generator continues at block 1805. In block 1804, the subcommand generator generates a subcommand that includes the base address and the transfer size as the number of bytes and then waits for the next message. In decision block 1805, if the command is strided, the subcommand generator continues at block 1806, else the subcommand generator continues at block 1807. In block 1806, the subcommand generator generates a repetition count number of subcommands. When generating a subcommand, the subcommand generator may use the base address as the address and the element size for the subcommand and then add the stride to the base address for generating the next subcommand and then waits for the next message. In decision block 1807, if the operation is index, then the subcommand generator continues at block 1808. In block 1808, the subcommand generator generates a subcommand that includes the sum of the base address and the index as the address of the subcommand and the element size as the number of bytes and then waits for the next message.

In some embodiments, each message sent from the control processor to a load-store unit includes a header and a payload. The header specifies whether it is directed to the load subcommand generator or the store subcommand generator and may indicate registers that are to be loaded with new values and may indicate whether to start generating subcommands. The payload contains the values for the registers. The headers for the messages may be sent in band with payload or on a sideband. If sent in band, the header is sent first followed by the payload over the same channel. For example, if the channel is 32 bits wide, then the first few 32-bit flits of a message represent the header followed by a number of 32-bit flits representing the payload. In contrast, if sent on a sideband, the channel may have 32 bits for a payload and 16 bits (i.e., the sideband) for a header. For example, when the message indicates an index operation, the control processor may first send a message for storing values in the command, base address, and element size registers. The sideband header would indicate the destination and the register number. The control processor may then send a stream of messages, one for each index. The header sent on the side band would indicate whether it is directed to the load subcommand generator or the store subcommand generator, that payload contains a new value for index register, and to generate the next subcommand.

The host processor may be part of a computing system that may include a central processing unit, input devices, output devices (e.g., display devices and speakers), storage devices (e.g., memory and disk drives), network interfaces, graphics processing units, accelerometers, cellular radio link interfaces, global positioning system devices, and so on. A computing system may include desktop computers, laptops, tablets, e-readers, personal digital assistants, smartphones, gaming devices, servers, and so on. The computing system may be servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements components of the control processor, operating system, and application. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The components of the control processor, operating system, and application may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the data reorganization engine may be implemented in hardware using, for example, an application-specific integrated circuit (ASIC).

The following paragraphs describe various embodiments of aspects relating to the memory system package and its use. An implementation of a memory system package and its use may employ any combination of the embodiments.

In some embodiments, a memory subsystem package having processing logic for data reorganization within the memory subsystem package is provided. The memory subsystem package comprises a plurality of memory units having memory; a memory interconnect connecting memory units to data reorganization engine units and enabling data reorganization engine units to access memory of the memory units; and a data reorganization engine comprising: a stream interconnect connecting data reorganization engine units of the data reorganization engine and enabling the data reorganization engine units to transmit data and receive data via the stream interconnect; a control processor that is a data reorganization engine unit, that is connected to the memory interconnect, and that is connected to the stream interconnect, the control processor adapted to execute instructions to perform a data reorganization; and a load-store unit that is a data reorganization engine unit, that is connected to the memory interconnect, that is connected to the stream interconnect, and that is adapted to process data move commands received from the control processor via the stream interconnect for loading data from a load memory address of a memory unit and for storing data to a store memory address of a memory unit. In some embodiments, the load-store unit comprises: a load component adapted to load data from a load memory address and output the loaded data onto the stream interconnect; a store component adapted to input data from the stream interconnect and store the input data to a store memory address; and a sequencer component adapted to input via the stream interconnect commands sent by the control processor for controlling data reorganization of data stored in a memory unit and to effect the data reorganization by supplying load memory addresses to the load component and store memory addresses to the store component. In some embodiments, the load-store unit further comprises: a load FIFO buffer that is connected to a load module of the load component and the sequencer component and that is adapted to buffer load memory addresses supplied by the sequencer component to the load component; and a store FIFO buffer that is connected to a store module of the store component and the sequencer component and that is adapted to buffer store memory addresses supplied by the sequencer component to the store component. In some embodiments, the sequencer component includes a data address register adapted to store a data memory address and a view memory address register adapted to store a view memory address, a data memory address being a memory address of a data buffer of a memory unit to be reorganized into a view buffer of a memory unit and a view memory address being a memory address of the view buffer. In some embodiments, the sequencer component is adapted to, when reorganizing the data of the data buffer into the view buffer: prior to each load of data, calculate a data buffer offset based on a command provided by the control processor and supply to the load component a sum of the data buffer memory address and the data buffer offset as the load memory address; initialize a store memory address to the view memory address; and prior to each store of data, supply to the store component the store memory address, and after supplying the store memory address, increment the store memory address. In some embodiments, the sequencer component is adapted to, when reorganizing the data of the view buffer into the data buffer: prior to each store of data, calculate a data buffer offset based on a command provided by the control processor and supply to the store component a sum of the data buffer memory address and the data buffer offset as the store memory address; initialize a load memory address to the view memory address; and prior to each load of data, supply to the load component the load memory address, and after supplying the load memory address, increment the load memory address. In some embodiments, the load-store unit is adapted to receive from the control processor via the stream interconnect a stream of data buffer offsets and use the data buffer offsets when performing a scatter/gather data reorganization. In some embodiments, the load-store unit is adapted to receive from the control processor via the stream interconnect an element size and a stride for a strided data reorganization. In some embodiments, the data reorganization engine includes multiple load-store unit units. In some embodiments, the data reorganization engine includes multiple control processors. In some embodiments, the data reorganization engine includes a host control interface that is a data reorganization engine unit, that is connected to the memory interconnect and the stream interconnect, and that is adapted to provide to a host processor access to the data reorganization engine. In some embodiments, the data reorganization engine includes an operation component that is connected to the stream interconnect and that is adapted to input data via the stream interconnect, perform an operation on the data to generate result data, and to output the result data via the stream interconnect. In some embodiments, the data reorganization engine includes multiple operation components. In some embodiments, the control processor includes a memory adapted to store instructions executable by the control processor to control data reorganization. In some embodiments, the control processor is adapted to receive from a host processor instructions executable by the control processor. In some embodiments, the data reorganization engine includes a memory management unit to translate virtual addresses to physical addresses.

In some embodiments, a method performed by a host processor for reorganizing data of a data buffer into a view buffer is provided. The data buffer and the view buffer are memory within a memory subsystem. The method comprises: issuing a setup command to a data reorganization engine of the memory subsystem, the setup command specifying a data buffer memory address of the data buffer and setup parameters for reorganizing data of the data buffer; and issuing a fill command to the data reorganization engine of the memory subsystem, the fill command specifying fill parameters for reorganizing data of the data buffer into the view buffer, wherein upon completion of the fill command by the data reorganization engine, the view buffer contains the reorganized data of the data buffer. In some embodiments, the method further comprises, after completion of the fill command, accessing data of the view buffer. In some embodiments, the method further comprises after accessing the data of the view buffer, issuing a drain command to the data reorganization engine of the memory subsystem, the drain command specifying drain parameters for reorganizing data of the view buffer into the data buffer. In some embodiments, the reorganizing is scatter/gather reorganizing, the setup parameters include a data buffer memory address and an index buffer memory address, and the fill parameters include an index buffer offset and view buffer size. In some embodiments, the fill parameters additionally include a view buffer memory address. In some embodiments, the method further comprising prior to issuing a fill command, flushing the data buffer and the index buffer from and invalidating the view buffer in the cache of the host processor. In some embodiments, the method further comprises prior to issuing a drain command, flushing the view buffer from and invalidating the data buffer in the cache of the host processor.

In some embodiments, a data reorganization engine for a memory subsystem package is provided. The memory subsystem package has memory units and a memory interconnect. The data reorganization engine comprises: a stream interconnect; a control processor that is connected to the memory interconnect and the stream interconnect, the control processor adapted to execute instructions for reorganizing data of a data buffer within a memory unit into a view buffer within a memory unit; and a load-store unit that is connected to the memory interconnect and the stream interconnect and that is adapted to process data move commands received from the control processor via the stream interconnect for loading data from a load memory address of a memory unit and for storing data to a store memory address of a memory unit. In some embodiments, the control processor and the load-store unit are implemented in a logic layer associated with a 3D-memory package. In some embodiments, the data reorganization engine further comprises an operation unit that is connected to the stream interconnect and adapted to performing operations on data received from the load-store unit and output to the load-store unit results of the operation, wherein the load-store unit is further adapted to output loaded data to the operation unit and store data input from the operation unit. In some embodiments, the data reorganization engine includes multiple load-store units and operation units that are adapted to output data to the operation units and to input data from the operation units via the stream interconnect.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A memory subsystem package having processing logic for data reorganization within the memory subsystem package, the memory subsystem package comprising:
   a plurality of memory units having memory;
   a memory interconnect connecting memory units to data reorganization engine units and enabling data reorganization engine units to access memory of the memory units; and
   a data reorganization engine comprising:
      a stream interconnect connecting data reorganization engine units of the data reorganization engine and enabling the data reorganization engine units to transmit data and receive data via the stream interconnect;
      a control processor that is a data reorganization engine unit, that is connected to the memory interconnect, and that is connected to the stream interconnect, the control processor adapted to execute instructions to perform a data reorganization; and
      a load-store unit that is a data reorganization engine unit, that is connected to the memory interconnect, that is connected to the stream interconnect, and that is adapted to process data move commands received from the control processor via the stream interconnect for loading data from a load memory address of a memory unit and for storing data to a store memory address of a memory unit.

2. The memory subsystem package of claim 1 wherein the load-store unit comprises:
   a load component adapted to load data from a load memory address and output the loaded data onto the stream interconnect;
   a store component adapted to input data from the stream interconnect and store the input data to a store memory address; and
   a sequencer component adapted to input via the stream interconnect commands sent by the control processor for controlling data reorganization of data stored in a memory unit and to effect the data reorganization by supplying load memory addresses to the load component and store memory addresses to the store component.

3. The memory subsystem package of claim 2 wherein the load-store unit further comprises:
   a load FIFO buffer that is connected to a load module of the load component and the sequencer component and that is adapted to buffer load memory addresses supplied by the sequencer component to the load component; and
   a store FIFO buffer that is connected to a store module of the store component and the sequencer component and that is adapted to buffer store memory addresses supplied by the sequencer component to the store component.

4. The memory subsystem package of claim 2 wherein the sequencer component includes a data address register adapted to store a data memory address and a view memory address register adapted to store a view memory address, a data memory address being a memory address of a data buffer of a memory unit to be reorganized into a view buffer of a memory unit and a view memory address being a memory address of the view buffer.

5. The memory subsystem package of claim 4 wherein the sequencer component is adapted to, when reorganizing the data of the data buffer into the view buffer:
   prior to each load of data, calculate a data buffer offset based on a command provided by the control processor and supply to the load component a sum of the data buffer memory address and the data buffer offset as the load memory address;
   initialize a store memory address to the view memory address; and
   prior to each store of data, supply to the store component the store memory address, and after supplying the store memory address, increment the store memory address.

6. The memory subsystem package of claim 4 wherein the sequencer component is adapted to, when reorganizing the data of the view buffer into the data buffer:
   prior to each store of data, calculate a data buffer offset based on a command provided by the control processor and supply to the store component a sum of the data buffer memory address and the data buffer offset as the store memory address;
   initialize a load memory address to the view memory address; and
   prior to each load of data, supply to the load component the load memory address, and after supplying the load memory address, increment the load memory address.

7. The memory subsystem package of claim 1 wherein the load-store unit is adapted to receive from the control processor via the stream interconnect a stream of data buffer offsets and use the data buffer offsets when performing a scatter/gather data reorganization.

8. The memory subsystem package of claim 1 wherein the load-store unit is adapted to receive from the control processor via the stream interconnect an element size and a stride for a strided data reorganization.

9. The memory subsystem package of claim 1 wherein the data reorganization engine includes multiple load-store unit units.

10. The memory subsystem package of claim 9 wherein the data reorganization engine includes multiple control processors.

11. The memory subsystem package of claim 1 wherein the data reorganization engine includes a host control interface that is a data reorganization engine unit, that is connected to the memory interconnect and the stream interconnect, and that is adapted to provide to a host processor access to the data reorganization engine.

12. The memory subsystem package of claim 1 wherein the data reorganization engine includes an operation component that is connected to the stream interconnect and that is adapted to input data via the stream interconnect, perform an operation on the data to generate result data, and to output the result data via the stream interconnect.

13. The memory subsystem package of claim 12 wherein the data reorganization engine includes multiple operation components.

14. The memory subsystem package of claim 1 wherein the control processor includes a memory adapted to store instructions executable by the control processor to control data reorganization.

15. The memory subsystem package of claim 14 wherein the control processor is adapted to receive from a host processor instructions executable by the control processor.

16. The memory subsystem package of claim 1 wherein the data reorganization engine includes a memory management unit to translate virtual addresses to physical addresses.

17. A method performed by a host processor for reorganizing data of a data buffer into a view buffer, the data buffer and the view buffer being memory within a memory subsystem, the method comprising:
 issuing a setup command to a data reorganization engine of the memory subsystem, the setup command specifying a data buffer memory address of the data buffer and setup parameters for reorganizing data of the data buffer; and
 issuing a fill command to the data reorganization engine of the memory subsystem, the fill command specifying fill parameters for reorganizing data of the data buffer into the view buffer,
 wherein upon completion of the fill command by the data reorganization engine, the view buffer contains the reorganized data of the data buffer.

18. The method of claim 17 further comprising, after completion of the fill command, accessing data of the view buffer.

19. The method of claim 18 further comprising, after accessing the data of the view buffer, issuing a drain command to the data reorganization engine of the memory subsystem, the drain command specifying drain parameters for reorganizing data of the view buffer into the data buffer.

20. The method of claim 17 wherein the reorganizing is scatter/gather reorganizing, the setup parameters include a data buffer memory address and an index buffer memory address, and the fill parameters include an index buffer offset and view buffer size.

21. The method of claim 20 wherein the fill parameters additionally include a view buffer memory address.

22. The method of claim 20 further comprising, prior to issuing a fill command, flushing the data buffer and the index buffer from and invalidating the view buffer in the cache of the host processor.

23. The method of claim 20 further comprising, prior to issuing a drain command, flushing the view buffer from and invalidating the data buffer in the cache of the host processor.

24. A data reorganization engine for a memory subsystem package, the memory subsystem package having memory units and a memory interconnect, comprising:
 a stream interconnect;
 a control processor that is connected to the memory interconnect and the stream interconnect, the control processor adapted to execute instructions for reorganizing data of a data buffer within a memory unit into a view buffer within a memory unit; and
 a load-store unit that is connected to the memory interconnect and the stream interconnect and that is adapted to process data move commands received from the control processor via the stream interconnect for loading data from a load memory address of a memory unit and for storing data to a store memory address of a memory unit.

25. The data reorganization engine of claim 24 wherein the control processor and the load-store unit are implemented in a logic layer associated with a 3D-memory package.

26. The data reorganization engine of claim 24 wherein further comprising an operation unit that is connected to the stream interconnect and adapted to performing operations on data received from the load-store unit and output to the load-store unit results of the operation, wherein the load-store unit is further adapted to output loaded data to the operation unit and store data input from the operation unit.

27. The data reorganization engine of claim 24 that includes multiple load-store units and operation units, the load-store units adapted to output data to the operation units and to input data from the operation units via the stream interconnect.

* * * * *